United States Patent
Doncov (10) Patent No.: US 6,796,595 B2
(45) Date of Patent: Sep. 28, 2004

(54) VEHICLE CONVERTIBLE ROOF

(75) Inventor: Stephen A. Doncov, Trenton, MI (US)

(73) Assignee: ASC Incorporated, Southgate, MI (US)

( * ) Notice: Subject to any disclaimer, the term of this patent is extended or adjusted under 35 U.S.C. 154(b) by 54 days.

(21) Appl. No.: 10/177,730

(22) Filed: Jun. 21, 2002

(65) Prior Publication Data

US 2003/0234553 A1 Dec. 25, 2003

(51) Int. Cl.$^7$ ................................................ B60J 7/00
(52) U.S. Cl. ................... 296/107.09; 296/109; 296/118
(58) Field of Search ................ 296/107.01, 107.09, 296/109, 118, 105, 116, 117, 121, 122, 108

(56) References Cited

U.S. PATENT DOCUMENTS

| | | | |
|---|---|---|---|
| 4,958,882 A | * 9/1990 | Kolb | .......................... 296/108 |
| 5,207,474 A | 5/1993 | Licher et al. | |
| 5,620,226 A | 4/1997 | Sautter, Jr. | |
| 5,746,470 A | 5/1998 | Seel et al. | |
| 5,772,274 A | 6/1998 | Tokarz | |
| 5,785,375 A | 7/1998 | Alexander et al. | |
| 5,829,821 A | 11/1998 | Aydt et al. | |
| 5,848,819 A | 12/1998 | Sautter, Jr. | |
| 5,887,936 A | 3/1999 | Cowsert | |
| 5,903,119 A | * 5/1999 | Laurain et al. | ......... 296/107.09 |
| 5,971,470 A | 10/1999 | May et al. | |
| 5,998,948 A | * 12/1999 | Lange et al. | ................. 296/122 |
| 6,039,383 A | 3/2000 | Jambor et al. | |
| 6,048,021 A | * 4/2000 | Sautter, Jr. | ................... 296/117 |
| 6,102,467 A | 8/2000 | Laurain et al. | |
| 6,131,988 A | 10/2000 | Queveau et al. | |
| 6,199,936 B1 | 3/2001 | Mac Farland | |
| 6,209,945 B1 | 4/2001 | Aydt et al. | |
| 6,237,986 B1 | * 5/2001 | Neubrand et al. | ...... 296/107.01 |
| 6,270,143 B1 | 8/2001 | Heselhaus et al. | |
| 6,293,605 B2 | 9/2001 | Neubrand | |
| 6,305,734 B1 | * 10/2001 | Pecho et al. | ........... 296/107.01 |
| 6,347,827 B1 | * 2/2002 | Maass | .................... 296/107.09 |
| 6,390,531 B1 | * 5/2002 | Schutt | ......................... 296/116 |
| 6,464,284 B2 | * 10/2002 | Neubrand | .............. 296/107.01 |
| 2002/0185886 A1 | * 12/2002 | Obendiek | .................... 296/108 |

OTHER PUBLICATIONS

Exhibits A1–A3 showing "Drawings of the convertible roof mechanism for the BMW Z4 automobile," believed to have been publicly used or offered for sale in the United States prior to Jun. 21, 2002.

* cited by examiner

Primary Examiner—Lori L Coletta
(74) Attorney, Agent, or Firm—Harness, Dickey & Pierce, P.L.C.

(57) ABSTRACT

A convertible roof including a mechanism to actively control a second roof bow. In another aspect, a unique and novel way to control the folding of the convertible roof mechanism is employed such that a portion of the convertible roof serves as a cover that conceals the convertible roof within the boot well. In another aspect, the convertible roof is a "Z" folding top having four pairs of roof rails is also disclosed.

57 Claims, 10 Drawing Sheets

VEHICLE CONVERTIBLE ROOF

BACKGROUND AND SUMMARY OF THE INVENTION

This invention generally relates to convertible roofs for automotive vehicles and, more particularly, to a convertible roof that is stored in a stowage compartment of the vehicle with an exterior portion of the roof facing upward and covering the compartment.

Traditional soft-top convertible roofs for automotive vehicles typically employ three, four or five roof bows, having an inverted U-shape spanning transversely across the vehicle for supporting a vinyl, canvas or polyester fabric pliable roof cover. A number one roof bow is mounted to a pair of front roof rails and is typically latched to a stationary front header panel of the automotive vehicle body disposed above the front windshield. A number two roof bow is typically mounted to a pair of center roof rails which are pivotably connected to the front roof rails. Furthermore, the number three, four and any additional optional roof bows are commonly mounted to a pair of rear roof rails which are pivotably coupled to the center roof rails. The roof cover can also have a hard or rigid portion along with the pliable portion. For example, reference should be made to U.S. Pat. No. 5,429,409 entitled "Convertible Top", which is incorporated by reference herein. Most traditional convertible roofs are stowed in a boot well or stowage compartment that is located aft of a passenger compartment in the vehicle. A boot or tonneau cover is then used to cover the boot well and conceal the convertible roof from view and/or protect the stowed roof from the environment.

The use of a boot cover or tonneau cover increases the cost and complexity of a vehicle with a convertible roof. Additionally, the separate boot cover also increases the number of operating parts and material required to conceal the stowed convertible roof from view and/or protect it from the environment. Therefore, it would be desirable if the boot cover could be integrated into the convertible roof such that a portion of the convertible roof also functions as the boot cover when the convertible roof is in its stowed position.

Traditional soft-top convertible roofs can present a packaging (stowing) difficulty when it is desired to use a "Z" folding roof. The difficulty is more pronounced when a "Z" folding roof is desired to be used on a larger vehicle (vehicle having front and rear seating areas). Traditional "Z" folding roofs have second and subsequent roof bows that are passively controlled and rely upon the movement of the flexible cover to position the roof bows when the convertible roof is transitioned from raised and stowed positions and typically have three pairs of coupled roof rails. Passively controlling the second roof bow, however, may not position the second roof bow in a proper orientation or may require excessive stowage space. Additionally, the use of three pairs of coupled roof rails also adds to the packaging difficulty. Therefore, it would be desirable to actively control the second and/or subsequent roof bows to control the positioning of the roof bows when transitioning from raised and stowed positions. It would also be desirable to provide a "Z" folding roof that utilizes a fourth pair of roof rails.

In accordance with the present invention, a convertible roof is provided which includes a mechanism to actively control a second roof bow. In another aspect of the present invention, a unique and novel way to control the folding of the convertible roof mechanism is employed such that a portion of the convertible roof serves as a cover that conceals the convertible roof within the boot well.

Along with actively controlling a second roof bow and controlling the top so that a portion serves as a cover, additional objects, advantages and features of the present invention will become apparent from the following description and appended claims, taken in conjunction with the accompanying drawings. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1A:
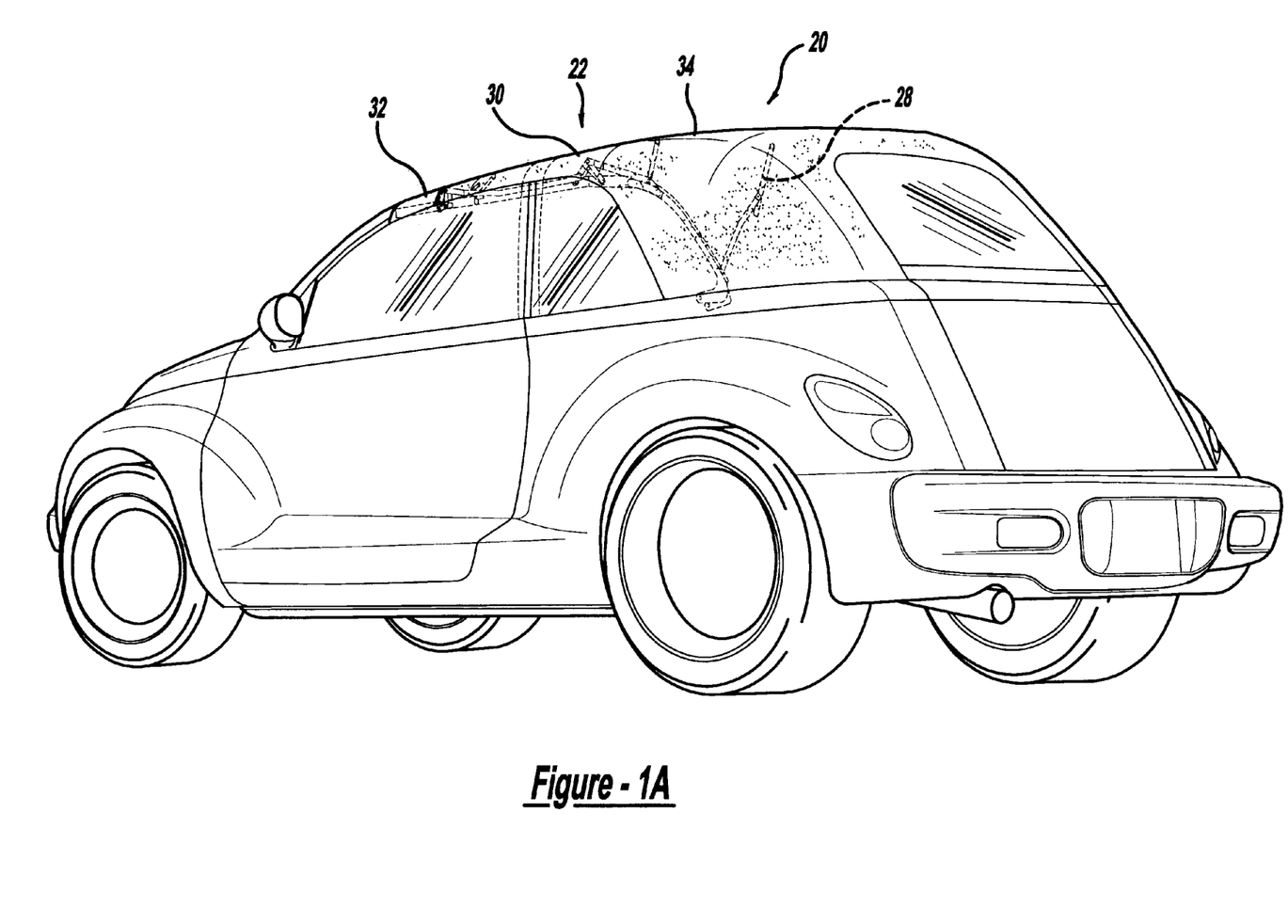
FIG. 1A is a perspective view of a vehicle with a convertible roof in A raised operative position in accordance with the principles of the present invention.
Figure 1B:
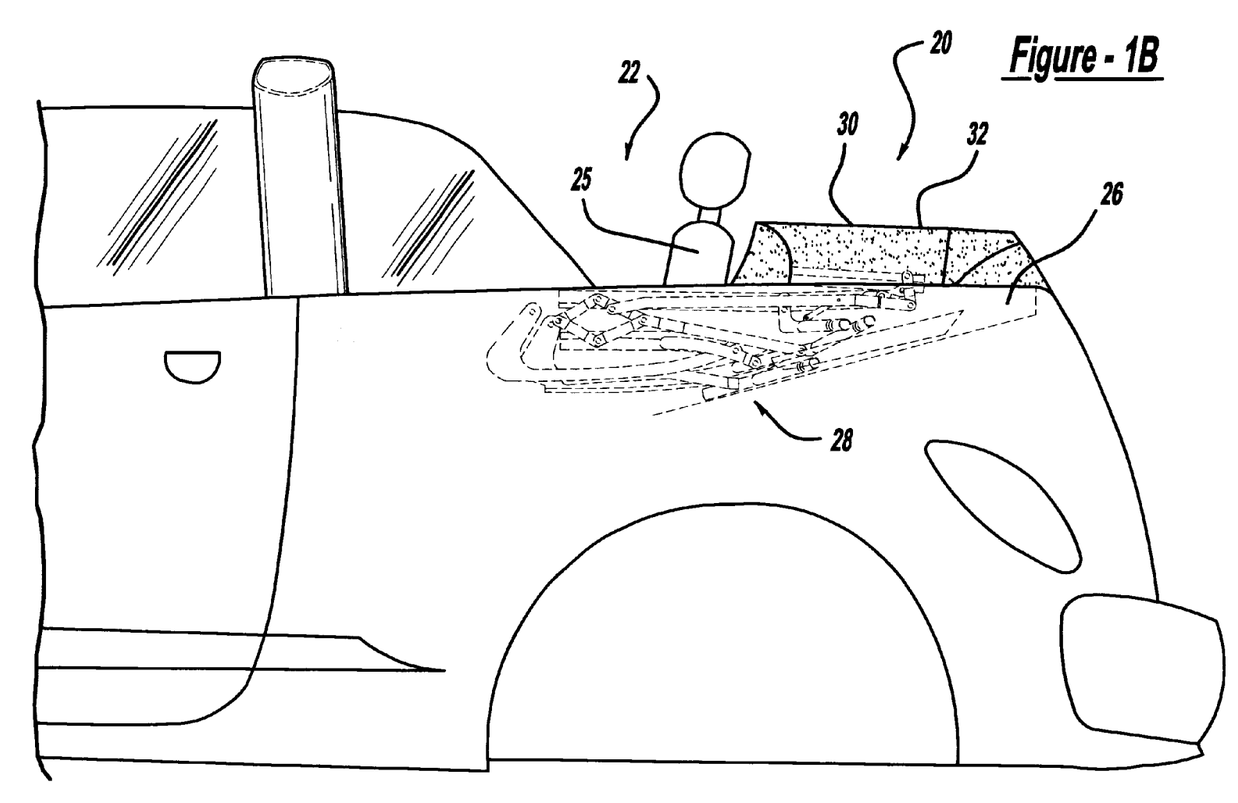
FIG. 1B is a side elevation view of the vehicle of FIG. 1A with the convertible roof in a stowed position in accordance with the principles of the present invention.
Figure 1C:
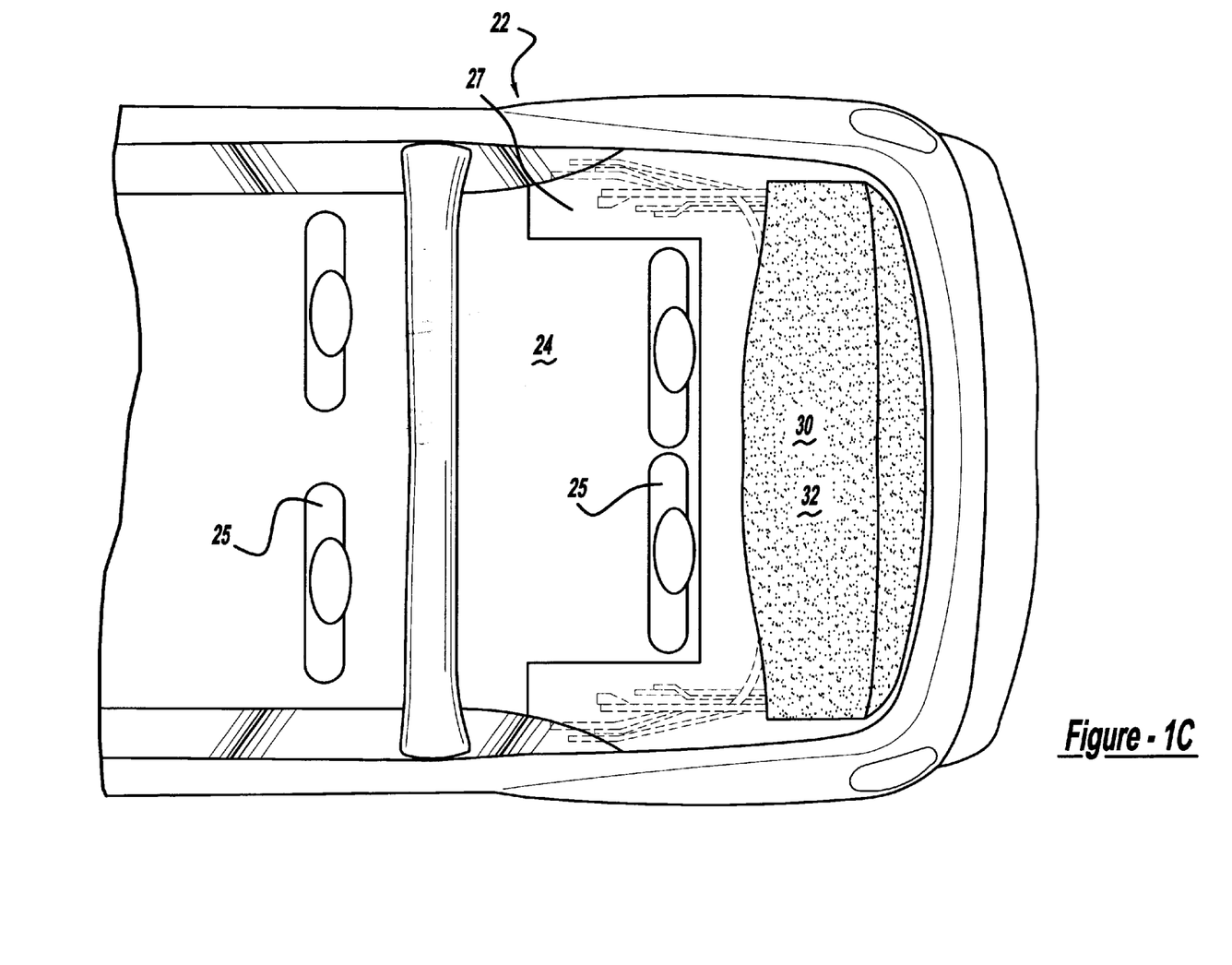
FIG. 1C is an overhead view of the vehicle in FIG. 1B.

FIGS. 1A–C show the preferred embodiment of a convertible roof 20 of the present invention. In this embodiment, convertible roof 20 is employed on an automotive vehicle 22 having a passenger compartment 24 with passenger seats 25 and a generally U-shaped boot well or stowage compartment 26. Stowage compartment 26 is positioned aft of passenger compartment 24 with quarter trim portions 27 extending along a portion of sides of passenger compartment 24. Convertible roof 20 is of the type utilizing a folding or top stack mechanism 28 that partially supports a roof cover 30 and is operable between a fully raised position, as shown in FIG. 1A, and a fully stowed position, as shown in FIGS. 1B and 1C. Roof cover 30 includes a hard or rigid portion 32, a pliable or soft portion 34, and a window or backlite 36. Soft portion 34 is made from a pliable material, such as vinyl, canvas or a polyester fabric. If desired, hard portion 32 can be covered by the same material that comprises soft portion 34 to give a uniform appearance. Backlite 36 is attached to roof cover 30 and is not pivotably coupled to folding mechanism 28. For example, reference should be made to U.S. Pat. No. 5,887,936 titled Backlite System For Use In An Automotive Vehicle Convertible Roof, by Cowsert, and U.S. Pat. No. 6,102,467 titled Backlite Retention System For Use In An Automotive Vehicle Convertible Roof, by Laurain et al., both of which are herein incorporated by reference. Backlite 36 can be made of either a rigid material, such as glass, as shown, or a pliable transparent vinyl material (not shown).

Referring to FIGS. 2A–C, 3A–B, and 4A–B, convertible roof 20 and folding mechanism 28 are shown symmetrical about a longitudinal, fore-and-aft center line (not shown) of vehicle 22. Folding mechanism 28 includes right and left roof linkages on the respective right and left sides of vehicle 22. For brevity, only the right side of folding mechanism 28 is shown and discussed, however, it should be understood that left side linkages are also provided as part of folding mechanism 28 and are mirrored images of the right side. Also, when using the terms "fore" and "aft" and "front" and "back" in describing components of folding mechanism 28, such reference refers to the orientation of the components when folding mechanism 28 is in the fully raised position.

Folding mechanism 28 includes first roof bow 38 that extends transversely across vehicle 22 and has a front edge 39 that is latched to a stationary front header panel of vehicle 22 disposed above the front windshield when in the fully raised position, as shown in FIG. 1A. First roof bow 38 controls the soft portion 34 of cover 30. First roof bow 38 is fixedly connected to a front roof rail 40 Alternatively, first roof bow 38 can be formed integrally with front roof rail 40; for example, first bow 38 and front roof rail 40 can be integrally cast from aluminum or a magnesium alloy. Front roof rail 40 is pivotably coupled to a front center roof rail 42 by a first multi-link hinge assembly (MHA) 44. First MHA 44 controls the rotation of front roof rail 40 relative to front center roof rail 42.

Figure 3A:
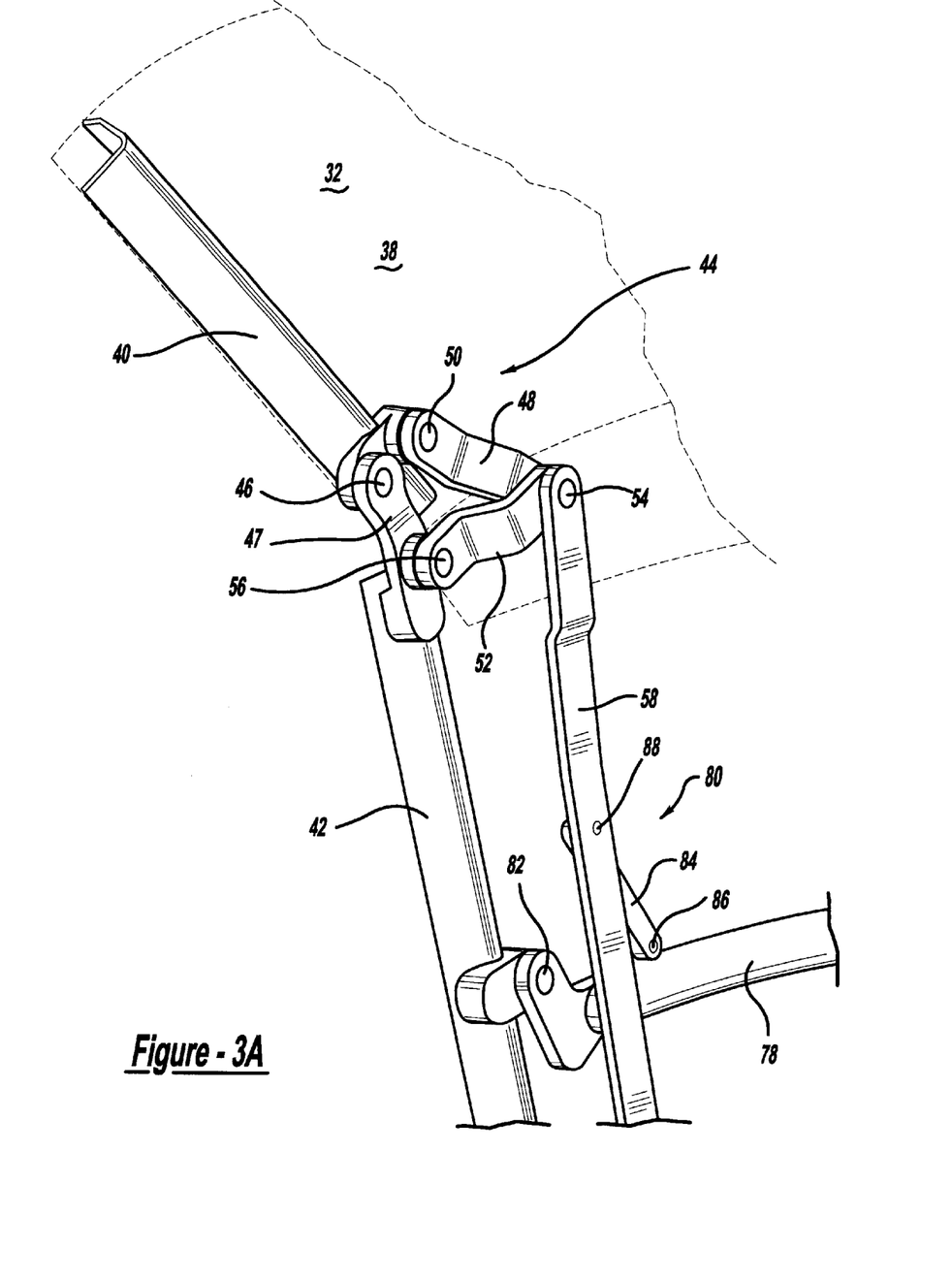
FIG. 3A is a perspective view of a front portion of the folding mechanism of FIG. 2B showing a hinge assembly coupling the front and front center roof rails and a control assembly that controls the second roof bow.
Figure 3B:
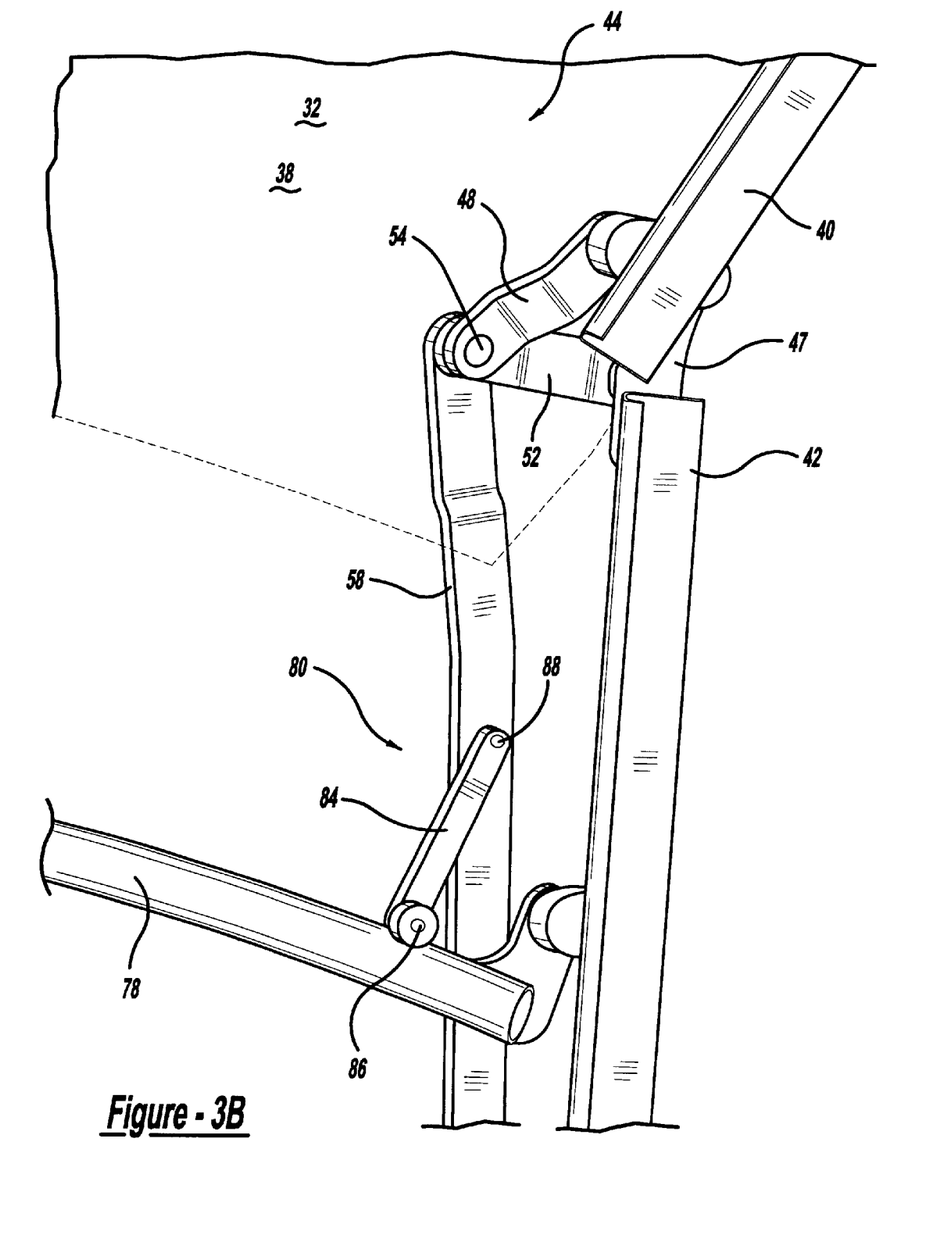
FIG. 3B is a perspective view, taken opposite FIG. 3A, showing the hinge assembly coupling the front and front center roof rails and the control assembly that controls the second roof bow.
Figure 4A:
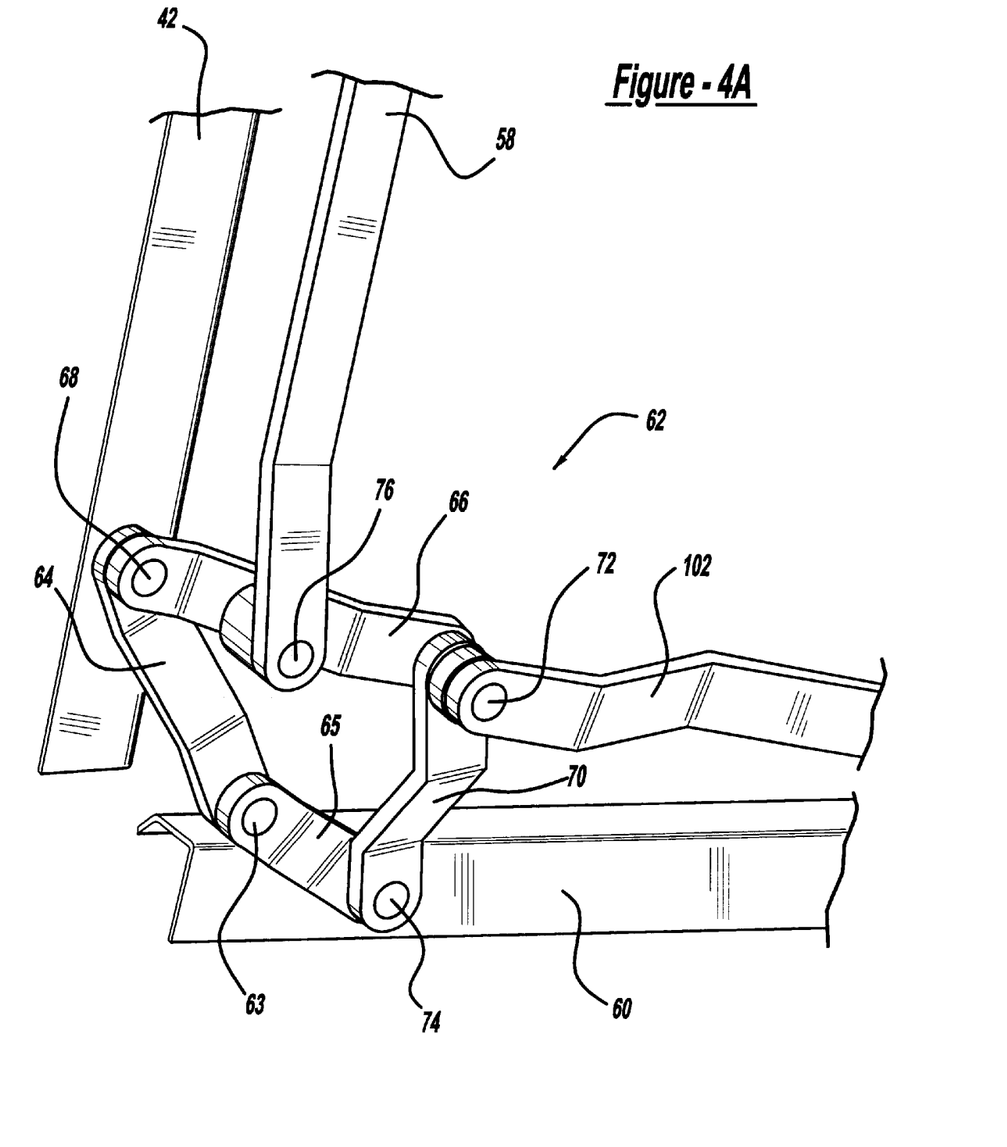
FIG. 4A is a perspective view of a midportion of the folding mechanism of FIG. 2B showing a hinge assembly coupling the front center roof rail with the rear center roof rail.
Figure 4B:
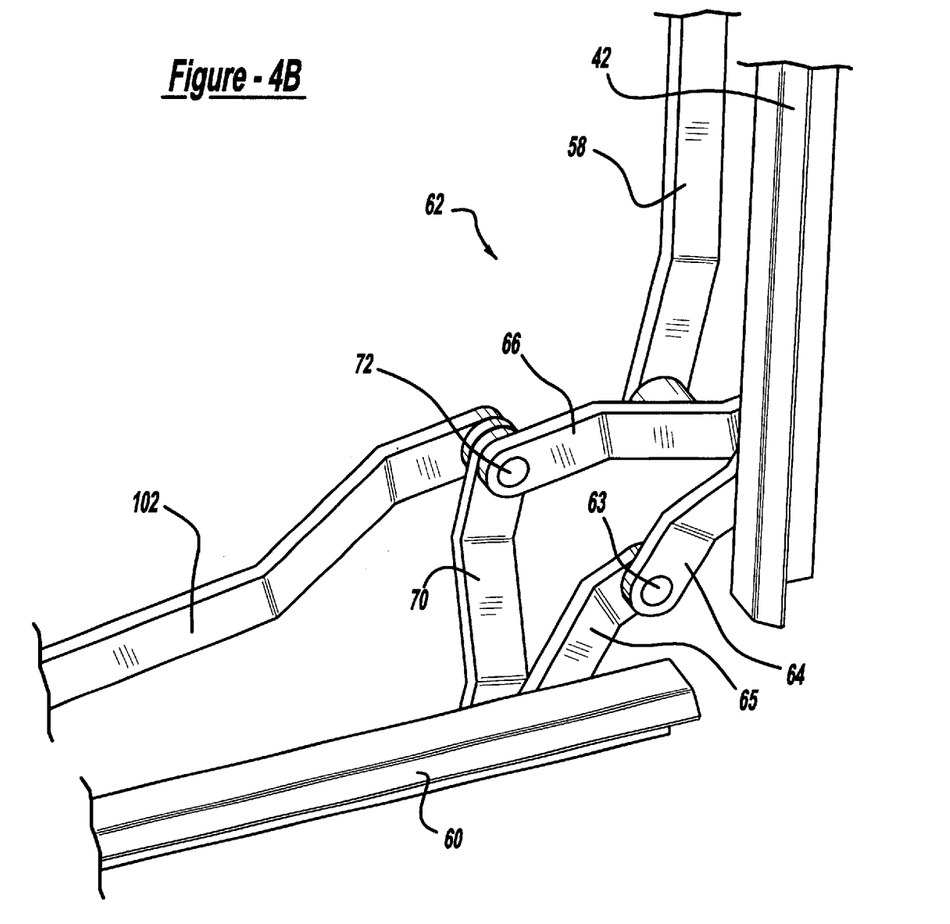
FIG. 4B is a perspective view, taken opposite FIG. 3A, showing the hinge assembly coupling the front center roof rail with the rear center roof rail.

Referring now to FIGS. 3A and 3B, the details of first MHA 44 are shown. First MHA 44 includes a pivot connection 46 between a back end portion of front roof rail 40 and an integral extension 47 of a front end portion of front center roof rail 42. One end of a first link 48 is pivotably connected to the back end portion of front roof rail 40 at pivot 50 while an opposite end is pivotably connected to an end of a second link 52 at pivot 54. An opposite end of second link 52 is pivotably connected to the front end portion of front center roof rail 42 at pivot 56. Thus, first MHA 44 is a four-bar linkage that includes front roof rail 40, first link 48, second link 52, and front center roof rail 42. Movement of first MHA 44 is controlled by a first control link 58 which is pivotably coupled to first MHA 44. As can be seen in FIG. 3A, a front end portion of first control link 58 is pivotably connected to first and second links 48 and 52 at pivot 54.

Front center roof rail 42 is pivotably coupled to a rear center roof rail 60 by a second multi-link hinge assembly (MHA) 62. As can best be seen in FIGS. 4A and 4B, second MHA 62 includes a pivot connection 63 between an integral extension 64 of a back end portion of front center roof rail 42 and an integral extension 65 of a front end portion of rear center roof rail 60. One end of a third link 66 is pivotably connected to front center roof rail 42 at pivot 68 while an opposite end of third link 66 is pivotably connected to an end of a fourth link 70 at pivot 72. An opposite end of fourth link 70 is pivotably connected to the front end portion of rear center roof rail 60 at pivot 74. Thus, second MHA 62 is a four-bar linkage that includes rear center roof rail 60, front center roof rail 42, third link 66, and fourth link 70. Second MHA 62 controls the rotation of front center roof rail 42 relative to rear center roof rail 60.

Second MHA 62 also controls the operation of first MHA 44 via first control link 58. As was stated above, the front end portion of first control link 58 is pivotably connected to first MHA 44 at pivot 54. A back end portion of first control link 58 is pivotably connected to second MHA 62 and, more specifically, to third link 66 at pivot 76. When second MHA 62 moves, first control link 58 moves which in turn causes first MHA 44 to also move. Thus, not only does the movement of second MHA 62 control the rotation of front center roof rail 42 relative to rear center roof rail 60, it also controls the movement of first MHA 44, via first control link 58, which in turn controls the rotation of front roof rail 40 relative to front center roof rail 42.

First control link 58 also controls the movement of a second roof bow 78. As can best be seen in FIGS. 3A and 3B, second roof bow 78 is pivotably coupled to front center roof rail 42 by control assembly 80. Control assembly 80 includes second roof bow 78 which is pivotably connected to front center roof rail 42 at pivot 82. One end of a bow control link 84 is pivotably connected to second roof bow 78 at pivot 86 while an opposite end of bow control link 84 is pivotably connected to first control link 58 at pivot 88. Thus, control assembly 80 is a five-bar linkage that includes front center roof rail 42, second roof bow 78, bow control link 84, first control link 58, and third link 66 of second MHA 62 or second link 52 of first MHA 44. Movement of second roof bow 78 relative to front center roof rail 42 is caused by movement of first control link 58 which moves in response to movement of second MHA 62. Thus, the movement of control assembly 80 and of second roof bow 78 are controlled by the movement of second MHA 62.

Figure 2A:
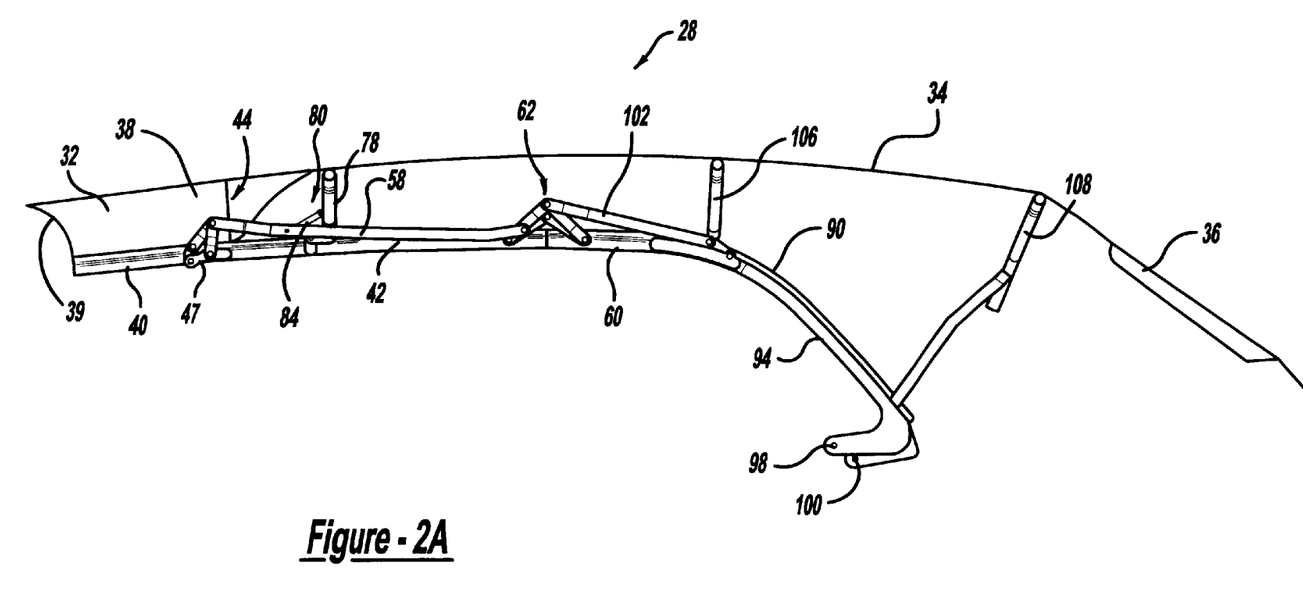
FIG. 2A is a side elevational view showing the right half of the preferred embodiment of the convertible roof folding mechanism of the present invention with the folding mechanism in a raised operative position.
Figure 2B:
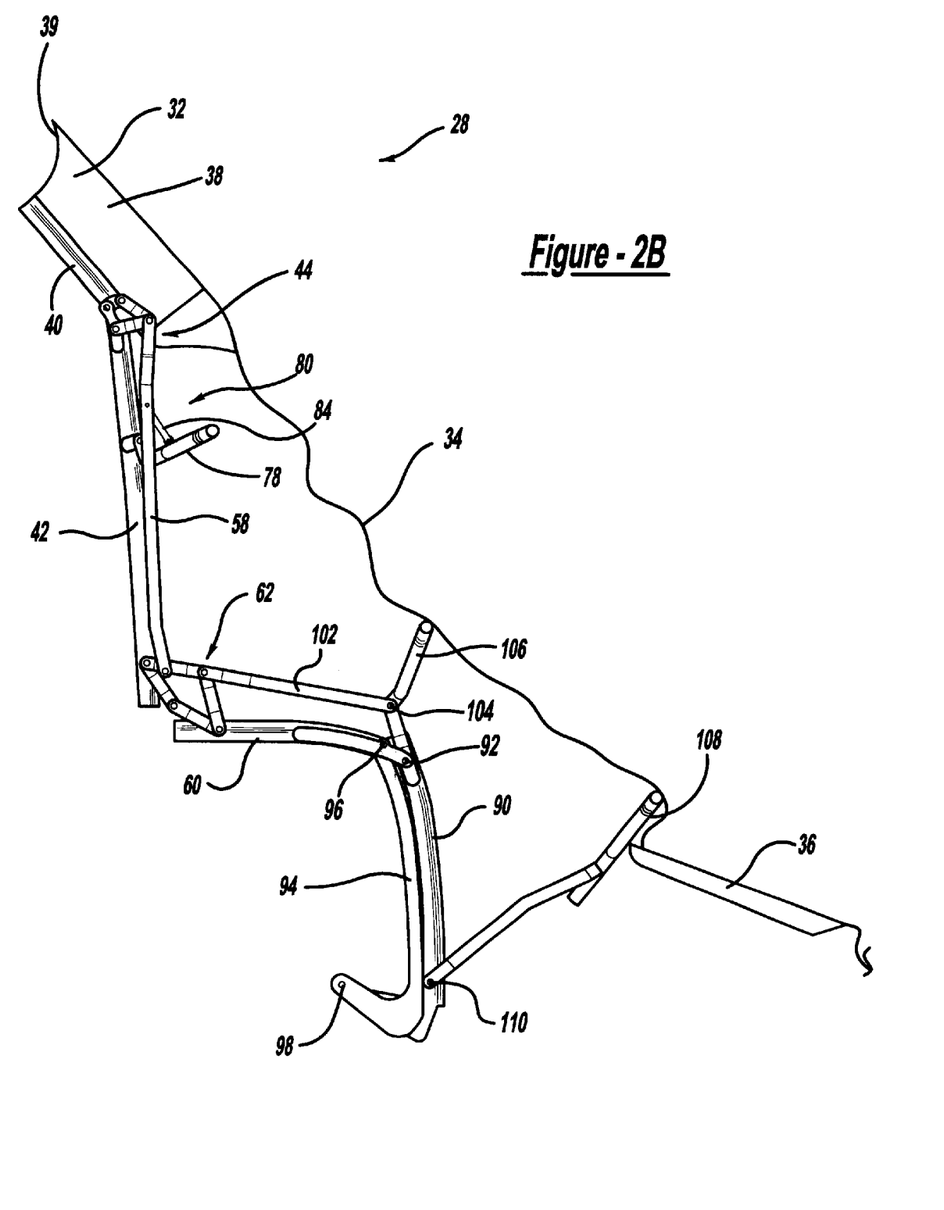
FIG. 2B is a side elevational view showing the right side of the preferred embodiment of the convertible roof folding mechanism of the present invention with the folding mechanism in a midpoint between the fully raised and stowed positions.
Figure 2C:
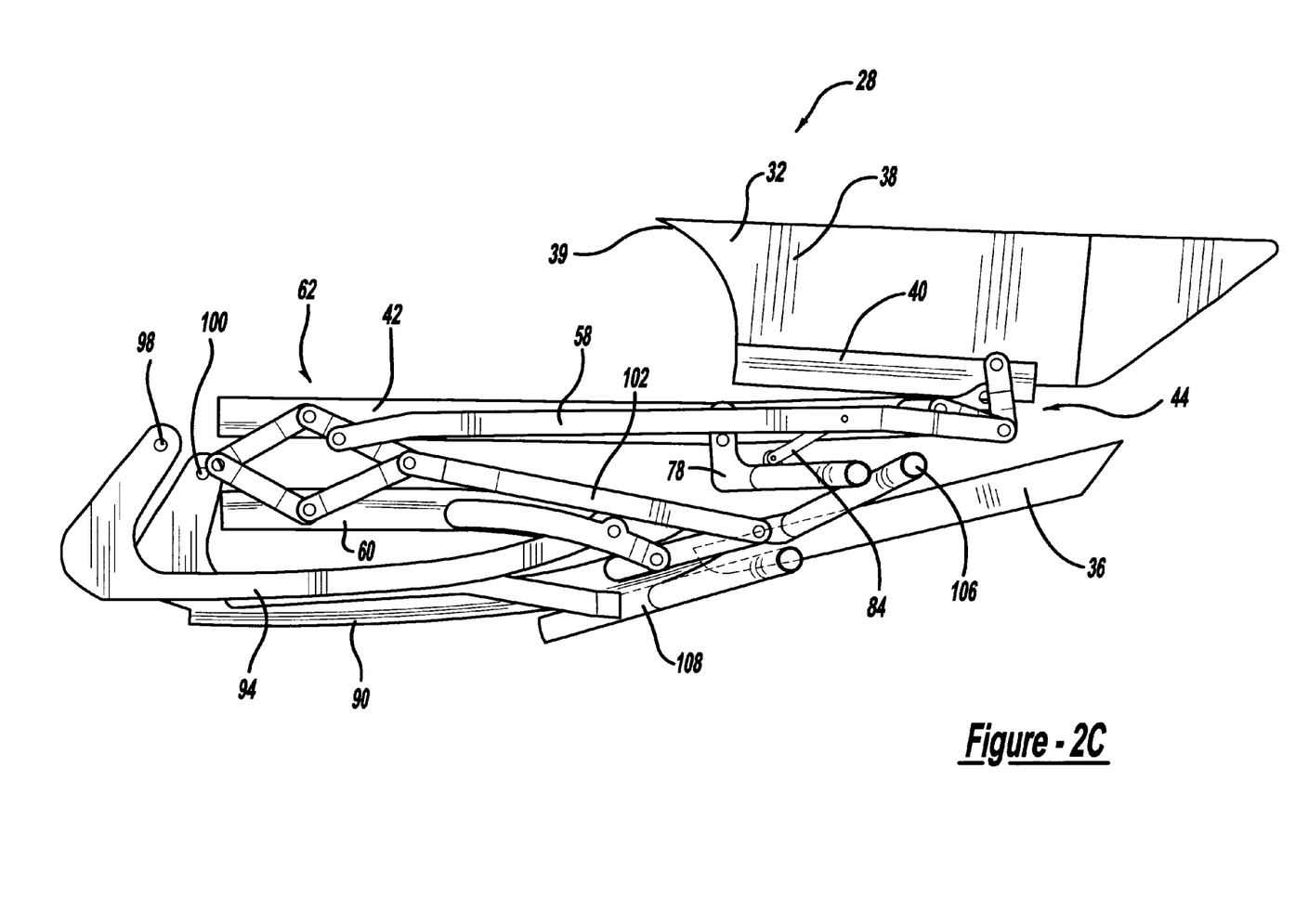
FIG. 2C is a side elevational view showing the right side of the preferred embodiment of the convertible roof folding mechanism of the present invention with the roof folding mechanism in the stowed position.

As can be seen in FIGS. 2A–2C, a back end portion of rear center roof rail 60 is pivotably coupled to an intermediate portion of a rear roof rail 90 at pivot 92 while an intermediate portion of rear center roof rail 60 is pivotably coupled to a front end portion of balance link 94 at pivot 96. A back end portion of balance link 94 is pivotably coupled to vehicle 22 at pivot 98. A back end portion of rear roof rail 90 is also pivotably coupled to vehicle 22 at pivot 100 which is behind and below pivot 98. Movement of rear roof rail 90 relative to vehicle 22 is controlled by an automatically powered driving element or actuator (not shown) such as an electric motor or hydraulic piston. Alternatively, the top stack mechanism can be manually driven. A back end portion of a second control link 102 is pivotably connected to a front end portion of rear roof rail 90 at pivot 104. A third roof bow 106 is also pivotably connected to second control link 102 and rear roof rail 90 at pivot 104. Third roof bow 106 is not actively controlled. Rather, third roof bow 106 is attached to roof cover 30 so that movement of roof cover 30 causes third roof bow 106 to pivot relative to second control link 102 and rear roof rail 90. A front end portion of second control link 102 is pivotably coupled to second MHA 62 and, more specifically, to third and fourth links 66 and 70 at pivot 72. Second control link 102 controls the movement of second MHA 62. Movement of second control link 102 is controlled by the movement of rear roof rail 90. Thus, movement of rear roof rail 90 controls the movement of second MHA 62. A fourth roof bow 108 is pivotably connected to rear roof rail 90 at pivot 110. Fourth roof bow 108 is also connected to roof cover 30. Fourth roof bow is not actively controlled. Rather, movement of fourth roof bow 108 is controlled by movement of roof cover 30.

Referring now to FIG. 2A, folding mechanism 28 is shown in its fully raised position corresponding to roof cover 30 covering passenger compartment 24 of vehicle 22. When in the raised position, front roof rail 40, front center roof rail 42, and rear center roof rail 60 are all generally aligned and first roof bow 38, second roof bow 78, third roof bow 106, and fourth roof bow 108 are fully extended so that roof cover 30 is taught with backlite 36 fully deployed. When convertible roof 20 is to be retracted, first roof bow 38 is unlatched from the front header of vehicle 22, as is known in the art, and the driving element (not shown) begins to cause rear roof rail 90 to rotate about pivot 100 in a clockwise direction when folding mechanism 28 is viewed from the perspective shown in FIGS. 2A–2C.

As can be seen in FIG. 2B, as folding mechanism 28 moves from the raised position toward the stowed position, the clockwise rotation of rear roof rail 90 causes second control link 102 and rear center roof rail 60 to move to the right and rotate counter clockwise relative to rear roof rail 90 and balance link 94. The movement of second control link 102 to the right causes second MHA 62 to rotate front center roof rail 42 clockwise relative to rear center roof rail 60. Second MHA 62 also pushes first control link 58 toward first MHA 44 which in turn causes front roof rail 40 to rotate counter clockwise relative to front center roof rail 42. The movement of first control link 58 also causes control assembly 80 to rotate second roof bow 78 in a counter clockwise direction relative to front center roof rail 42. The movement of folding mechanism 28 causes roof cover 30 to relax and begin to fold along with folding mechanism 28. The relaxing of roof cover 30 allows third and fourth roof bows 106 and 108 to rotate relative to folding mechanism 28 about respective pivots 104 and 110 as roof cover 30 folds. Backlite 36 also begins to fold into stowage compartment 26 as roof cover 30 folds. The active controlling of second roof bow 78 by control assembly 80 positions second roof bow 78 in a desired orientation and facilitates the stowage of top 20.

Referring now to FIG. 2C, folding mechanism 28 is shown in its fully stowed position which corresponds to being located within stowage compartment 26. As can be seen, folding mechanism 28 folds in an accordion-type fashion so that folding mechanism 28 folds and stacks upon itself and an exterior portion of roof cover 30 and, more specifically, hard portion 32 of roof cover 30 faces upward from stowage compartment 26 and has a substantially horizontal orientation. Hard portion 32 covers the portion of stowage compartment 26 that is aft of passenger seats 25 and becomes essentially the only visible part of convertible roof 20 behind passenger seats 25 that can be seen when convertible roof 20 is in the stowed position. Hard portion 32 is configured so that a peripheral edge of hard portion 32 matches a shape or contour of a back belt of stowage compartment 26 to conceal and protect a portion of soft portion 34 and folding mechanism 28 when convertible roof 20 is in the stowed position. The left and right roof linkages of folding mechanism 28 are in quarter trim portions 27 of stowage compartment 26 when convertible roof 20 is in the stowed position. In short, convertible roof 20 of the present invention provides a unique ability to function as a convertible roof in its raised operative position and to function as an aesthetically attractive and rigid boot or tonneau cover in its stowed position.

When convertible roof 20 is moved from its stowed position to its raised position, folding mechanism 28 operates in a reverse fashion. The driving element (not shown) will be operated to cause rear roof rail 90 to rotate about pivot 100 in a counter clockwise direction. The counter clockwise rotation of rear roof rail 90 causes second control link 102 and rear center roof rail 60 to move to the left and rotate clockwise relative to rear roof rail 90 and balance link 94. The movement of second control link 102 to the left causes second MHA 62 to rotate front center roof rail 42 counter clockwise relative to rear center roof rail 60. Second MHA 62 also pulls first control link 58 away from first MHA 44 which in turn causes front roof rail 40 to rotate clockwise relative to front center roof rail 42. The movement of first control link 58 also causes control assembly 80 to rotate second roof bow 78 clockwise relative to front center roof rail 42. The movement of folding mechanism 28 causes roof cover 30 to expand and begin to unfold along with folding mechanism 28. The expanding of roof cover 30 causes third and fourth roof bows 106 and 108 to rotate relative to folding mechanism 28 about respective pivots 104 and 110 as roof cover 30 unfolds. Backlite 36 also begins to unfold from stowage compartment 26 as roof cover 30 unfolds. When folding mechanism 28 reaches its fully raised position, roof cover 30 is taught and front edge 39 of first roof bow 38 can be latched to the front header of vehicle 22 above the front windshield. The active controlling of second roof bow 78 by control assembly 80 positions second roof bow 78 in a desired orientation.

While various aspects of convertible roof 20 and folding mechanism 28 have been disclosed, it will be appreciated that many other variations may be employed without departing from the scope of the present invention. For example, MHAs 44, 62 may be more than four-bar linkages. Additionally, the attachment of first control link 58 to first MHA 44 can be at a location other than pivot 54. For example, first control link 58 can be pivotably connected to only one of first or second links 48 and 52. The exact location of the various pivots of folding mechanism 28 can vary from their locations as shown in the drawings and still be within the scope of the present invention. For example, pivot 46 that pivotably connects front roof rail 40 to front center roof rail 42 can be located further toward the front end of front roof rail 40. Furthermore, the specific configurations and orientations of the various linkages and roof rails can have shapes that differ from those shown and still be within the scope of the present invention. Additionally, the roof can be stowed in a rear seating area of the passenger compartment.

The foregoing discussion discloses and describes merely an exemplary embodiment of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A convertible roof system for an automotive vehicle, said convertible roof system comprising:

(a) a roof cover; and (b) a folding mechanism supporting at least a portion of said roof cover, said folding mechanism being moveable between a stowed position and a raised position, said folding mechanism comprising:
(i) a first pair of roof rails;
(ii) a first roof bow that extends transversely between said first pair of roof rails, said first roof bow supporting a portion of said roof cover;
(iii) a second pair of roof rails;
(iv) a third pair of roof rails pivotably coupled to said second pair of roof rails; and
(v) a first pair of hinge assemblies pivotably coupling said first pair of roof rails to said second pair of roof rails, said first pair of hinge assemblies controlling movement of said first pair of roof rails relative to said second pair of roof rails so that said first, second, and third pairs of roof rails form a Z-shape and an exterior portion of said roof cover supported by said first roof bow faces upward when said folding mechanism is in said stowed position.

2. The convertible roof system of claim 1, wherein said first pair of hinge assemblies are controlled by a second pair of hinge assemblies.

3. The convertible roof system of claim 2, wherein said first pair of hinge assemblies are each four bar linkages.

4. The convertible roof system of claim 3, wherein said second pair of hinge assemblies are each four bar linkages.

5. The convertible roof system of claim 2, wherein said second pair of hinge assemblies couple said second pair of roof rails to said third pair of roof rails and control movement of said second pair of roof rails relative to said third pair of roof rails.

6. The convertible roof system of claim 2, wherein said first and second pairs of hinge assemblies are connected by a pair of control links.

7. The convertible roof system of claim 1, wherein said folding mechanism further comprises a fourth pair of roof rails pivotably coupled to said third pair of roof rails.

8. The convertible roof system of claim 7, wherein said pairs of roof rails fold on top of one another in an accordion-type manner when said folding mechanism is moved from said raised position to said stowed position.

9. The convertible roof system of claim 1, wherein the exterior portion of said roof cover covers a majority of a stowage compartment about a fore-aft center line.

10. The convertible roof system of claim 9, wherein said exterior portion of said cover conceals a portion of said mechanism within said stowage compartment from view.

11. The convertible roof system of claim 1, wherein said exterior portion is a rigid portion.

12. The convertible roof system of claim 1, wherein each hinge assembly is a four bar linkage.

13. A convertible roof system for an automotive vehicle, said convertible roof system comprising:
a roof cover; and
a top stack mechanism supporting at least a portion of said roof cover, said top stack mechanism being moveable between a stowed position and a raised position, said top stack mechanism comprising:
a first pair of roof rails;
a first roof bow that extends transversely between said first pair of roof rails, said first roof bow supporting a portion of said roof cover;
a second pair of roof rails;
a first pair of hinge assemblies pivotably coupling said first pair of roof rails to said second pair of roof rails, said first pair of hinge assemblies controlling movement of said first pair of roof rails relative to said second pair of roof rails;
a third pair of roof rails;
a second pair of hinge assemblies pivotably coupling said third pair of roof rails to said second pair of roof rails, said second pair of hinge assemblies controlling movement of said second pair of roof rails relative to said third pair of roof rails; and
a connecting member coupling said first pair of hinge assemblies to said second pair of hinge assemblies so that movement of said second pair of hinge assemblies causes movement of said first pair of hinge assemblies.

14. The convertible roof system of claim 13, wherein said first pair of roof rails rotates relative to said second pair of roof rails in an opposite direction to a rotation of said second pair of roof rails relative to said third pair of roof rails when said top stack mechanism is moved between said raised and stowed positions.

15. The convertible roof system of claim 14, wherein said top stack mechanism further comprises a fourth pair of roof rails pivotably coupled to said third pair of roof rails and said third pair of roof rails rotates relative to said fourth pair of roof rails in a direction opposite to said rotation of said second pair of roof rails relative to said third pair of roof rails when said top stack mechanism is moved between said raised and stowed positions.

16. The convertible roof system of claim 13, wherein said top stack mechanism further comprises a fourth pair of roof rails pivotably coupled to said third pair of roof rails.

17. The convertible roof system of claim 16, wherein said pairs of roof rails fold on top of one another in an accordion-type manner when said top stack mechanism is moved from said raised position to said stowed position.

18. The convertible roof system of claim 13, wherein said first pair of roof rails rotate relative to said second pair of roof rails so that an exterior portion of said roof cover supported by said first roof bow faces upward when said top stack mechanism is in said stowed position.

19. The convertible roof system of claim 13, wherein each of said first pair of hinge assemblies are four bar linkages.

20. The convertible roof system of claim 13, wherein each of said second pair of hinge assemblies are four bar linkages.

21. The convertible roof system of claim 13, wherein a portion of said roof cover supported by said first roof bow is rigid.

22. The convertible roof system of claim 13, wherein said top stack mechanism further comprises a second roof bow extending transversely between said second pair of roof rails and said second pair of hinge assemblies control movement of said second roof bow relative to said second pair of roof rails.

23. A convertible roof system for an automotive vehicle, said convertible roof system comprising:
a roof cover moveable between a stowed position and a raised position;
a first pair of roof rails;
a first roof bow extending transversely between said first pair of roof rails;
a second pair of roof rails pivotably connected to said first pair of roof rails;
a second roof bow pivotably connected to and extending transversely between said second pair of roof rails; and
a second bow control assembly that controls movement of said second roof bow relative to said second pair of roof rails,
wherein a vertical plane defined by an elongated cross car portion of said second roof bow is between fore and aft ends of said second pair of roof rails when said cover is in said raised position.

24. The convertible roof system of claim 23, further comprising a third pair of roof rails pivotably connected to said second pair of roof rails.

25. The convertible roof system of claim 24, further comprises a fourth pair of roof rails pivotably connected to said third pair of roof rails.

26. The convertible roof system of claim 23, wherein said first roof bow is fixedly attached to said first pair of roof rails so that said first roof bow does not move relative to said first pair of roof rails.

27. The convertible roof system of claim 23, wherein said second bow control assembly is pivotably connected to said second roof bow.

28. The convertible roof system of claim 23, wherein said second bow control assembly is connected to and controlled by a control assembly that controls movement of said first pair of roof rails relative to said second pair of roof rails.

29. The convertible roof system of claim 23, further comprising a third pair of roof rails pivotably connected to said second pair of roof rails by a pair of hinge assemblies, said pair of hinge assemblies controlling movement of said second bow control assembly.

30. A convertible roof system for an automotive vehicle, said convertible roof system comprising:
   a roof cover moveable between a stowed position and a raised position;
   a first pair of roof rails;
   a first roof bow extending transversely between said first pair of roof rails;
   a second pair of roof rails pivotably connected to said first pair of roof rails;
   a second roof bow pivotably connected to and extending transversely between said second pair of roof rails; and
   a second bow control assembly that controls movement of said second roof bow relative to said second pair of roof rails,
   wherein an exterior portion of said roof cover supported by said first roof bow faces upward when in said stowed position.

31. The convertible roof system of claim 23, wherein a portion of said roof cover supported by said first roof bow is rigid.

32. A convertible roof system for an automotive vehicle, said convertible roof system comprising:
   a roof cover; and
   a mechanism attached to the automotive vehicle and supporting at least a portion of said roof cover, said mechanism being moveable between a stowed position and a raised position, said raised position corresponding to said roof cover covering at least a portion of a passenger compartment in the automotive vehicle, and said stowed position corresponding to said roof cover being in a storage compartment aft of said passenger compartment, said mechanism comprising:
   a first pair of roof rails each having opposite fore and aft ends, said first pair of roof rails being connected by a first roof bow that extends transversely between said first pair of roof rails;
   a second pair of roof rails each having opposite fore and aft ends, said fore ends of said second pair of roof rails being pivotably connected to said aft ends of said first pair of roof rails;
   a second roof bow pivotably connected to at least one of said pairs of roof rails; and
   a first pair of multilink hinge assemblies controlling movement of said first pair of roof rails relative to said second pair of roof rails and movement of said second roof bow to control positioning of said second roof bow, said first pair of hinge assemblies each having first and second links, said first links being pivotably connected to said first pair of roof rails and pivotably connected to said second links and said second links being pivotably connected to said second pair of roof rails.

33. The convertible roof system of claim 32, wherein said mechanism further includes a first pair of control links, said first pair of control links being pivotably connected to and controlling the movement of said first pair of hinge assemblies.

34. The convertible roof system of claim 33, wherein said first pair of control links are pivotably connected to said second links.

35. The convertible roof system of claim 33, wherein said first pair of control links are pivotably connected to said first links.

36. The convertible roof system of claim 33, wherein said first pair of control links, said first links and said second links are pivotably connected at a common location.

37. The convertible roof system of claim 33, wherein said second roof bow is pivotably coupled to said first pair of control links.

38. The convertible roof system of claim 32, wherein a portion of said roof cover being supported by said first roof bow is rigid.

39. The convertible roof system of claim 32, wherein said first pair of roof rails pivots relative to said second pair of roof rails so that an exterior portion of said roof cover that is supported on said first roof bow faces outward when said mechanism is in said stowed position.

40. The convertible roof system of claim 32, wherein said second links are pivotably connected to said second pair of roof rails adjacent a fore end of said second pairs of roof rails.

41. The convertible roof system of claim 32, wherein said first links are pivotably connected to said first pair of roof rails adjacent an aft end of said first pair of roof rails.

42. The convertible roof system of claim 32, wherein aft ends of said second pair of roof rails move in two dimensions relative to the automotive vehicle when said mechanism is moving between said raised and stowed positions.

43. A method of actively controlling a second roof bow of a convertible roof moveable between raised and stowed positions comprising the steps of:
   (a) pivotably coupling a first pair of roof rails connected by a first roof bow to a second pair of roof rails with a first pair of multi-link hinge assemblies;
   (b) pivotably connecting the second roof bow, which is a member distinct from said first pair of multi-link hinge assemblies, to at least one of said first and second pairs of roof rails;
   (c) controlling movement of said first pair of roof rails relative to said second pair of roof rails with said first pair of hinge assemblies; and
   (d) controlling movement of said second roof bow relative to said at least one of said first and second pairs of roof rails so that said second roof bow is positioned in a desired orientation.

44. The method of claim 43, wherein step (d) includes coupling said second roof bow to said first pair of hinge assemblies so that movement of said first pair of hinge assemblies controls movement of said second roof bow.

45. The method of claim 43, further comprising the steps of:
- (e) pivotably coupling a third pair of roof rails to said second pair of roof rails with a second pair of multi-link hinge assemblies;
- (f) controlling movement of said third pair of roof rails relative to said second pair of roof rails with said second pair of hinge assemblies; and
- wherein said step (d) includes coupling said second roof bow to said second pair of hinge assemblies so that movement of said second pair of hinge assemblies controls movement of said second roof bow.

46. A method of covering a portion of a convertible roof within a stowage compartment with another portion of the convertible roof comprising the steps of:
- (a) pivotably coupling a first pair of roof rails connected by a first roof bow to a second pair of roof rails with a first pair of hinge assemblies;
- (b) supporting a portion of the convertible roof on said first roof bow;
- (c) pivotably coupling a third pair of roof rails to said second pair of roof rails with a second pair of hinge assemblies; and
- (d) folding said first, second and third pairs of roof rails relative to one another to form a Z-shape when the roof is in the stowage compartment with an exterior portion of the convertible roof supported by said first roof bow facing upward and an upwardly facing portion of said first pair of roof rails in a fully raised position facing upwardly when the roof is in the stowage compartment.

47. The method of claim 46, wherein step (d) includes folding said first, second and third pairs of roof rails so that said exterior portion of the convertible roof conceals a majority of the convertible roof within the stowage compartment about a fore-aft center line from view.

48. The method of claim 46, further comprising a step of (e) pivotably coupling a fourth pair of roof rails to said third pair of roof rails and wherein step (d) includes folding said first, second, third and fourth pairs of roof rails relative to one another in an accordion-type manner to move the roof into the stowage compartment with an exterior portion of the roof supported by said first roof bow facing upward.

49. A convertible roof system for an automotive vehicle, said convertible roof system comprising:
- (a) a roof cover; and
- (b) a folding mechanism supporting at least a portion of said roof cover, said folding mechanism being moveable between a stowed position and a raised position, said folding mechanism comprising:
  - (i) a first pair of roof rails;
  - (ii) a first roof bow that extends transversely between said first pair of roof rails, said first roof bow supporting a portion of said roof cover;
  - (iii) a second pair of roof rails;
  - (iv) a third pair of roof rails pivotably coupled to said second pair of roof rails;
  - (v) a fourth pair of roof rails pivotably coupled to said third pair of roof rails; and
  - (vi) a first pair of hinge assemblies pivotally coupling said first pair of roof rails to said second pair of roof rails, said first pair of hinge assemblies controlling movement of said first pair of roof rails relative to said second pair of roof rails so that said first, second, and third pairs of roof rails form a Z-shape and an exterior portion of said roof cover supported by said first row bow faces upward when said folding mechanism is in said stowed position.

50. The convertible roof system of claim 49, wherein said roof cover extends over front and back seating areas of an automotive vehicle.

51. A convertible roof system for an automotive vehicle, said convertible roof system comprising:
- a roof cover moveable between a stowed position and a raised position;
- a first pair of roof rails;
- a first roof bow extending transversely between said first pair of roof rails;
- a second pair of roof rails;
- a pair of multi-link hinge assemblies pivotally coupling said first pair of roof rails to said second pair of roof rails;
- a second roof bow pivotally connected to and extending transversely between said second pair of roof rails, said second roof bow being a member distinct from said multi-link hinge assemblies; and
- a second bow control assembly that controls movement of said second roof bow relative to said second pair of roof rails.

52. The convertible roof system of claim 51, wherein said second bow control assembly is connected to and controlled by a control link that controls movement of said multi-link hinge assemblies.

53. A method of actively controlling a second roof bow of a convertible roof moveable between raised and stowed positions comprising the steps of:
- (a) pivotably coupling a first pair of roof rails connected by a first roof bow to a second pair of roof rails with a first pair of multi-link hinge assemblies;
- (b) pivotably connecting the second roof bow to at least one of said first and second pairs of roof rails;
- (c) controlling movement of said first pair of roof rails relative to said second pair of roof rails with said first pair of hinge assemblies; and
- (d) controlling movement of said second roof bow relative to said at least one of said first and second pairs of roof rails so that said second roof bow is positioned in a desired orientation and a vertical plane defined by an elongated cross car portion of said second roof bow is between fore and aft ends of said second pair of roof rails when the convertible roof is in the raised position.

54. The method of claim 53, wherein step (d) includes coupling said second roof bow to said first pair of hinge assemblies so that movement of said first pair of hinge assemblies controls movement of said second roof bow.

55. A method of covering a portion of a convertible roof within a stowage compartment with a portion of the convertible roof comprising the steps of:
- (a) pivotably coupling a first pair of roof rails connected by a first roof bow to a second pair of roof rails with a first pair of hinge assemblies;
- (b) supporting a portion of the convertible roof on said first roof bow;
- (c) pivotably coupling a third pair of roof rails to said second pair of roof rails with a second pair of hinge assemblies; and
- (d) folding said first, second and third pairs of roof rails relative to one another to form a Z-shape when the roof is in the stowage compartment with an exterior portion of the convertible roof supported by said first roof bow facing upward and said first pair of roof rails pivoting forwardly relative to said second pair of roof rails when moving the convertible roof from a raised position to a stowed position.

56. The method of claim 55, wherein step (d) includes folding said first, second and third pairs of roof rails so that said exterior portion of the convertible roof conceals a majority of the convertible roof within the stowage compartment about a fore-aft center line from view.

57. The method of claim 55, further comprising a step of (e) pivotably coupling a fourth pair of roof rails to said third pair of roof rails and wherein step (d) includes folding said first, second, third and fourth pairs of roof rails relative to one another in an accordion-type manner to move the roof into the stowage compartment with an exterior portion of the roof supported by said first roof bow facing upward.

* * * * *

UNITED STATES PATENT AND TRADEMARK OFFICE
CERTIFICATE OF CORRECTION

PATENT NO.     : 6,796,595 B2
DATED          : September 28, 2004
INVENTOR(S)    : Stephen A. Doncov It is certified that error appears in the above-identified patent and that said Letters Patent is hereby corrected as shown below:

Column 2,
Line 18, "A" should be -- a --.

Column 5,
Line 17, "taught" should be -- taut --.

Column 6,
Line 29, "taught" should be -- taut --.

Column 11,
Line 66, "row" should be -- roof --.

Signed and Sealed this

Twenty-fifth Day of January, 2005

JON W. DUDAS
*Director of the United States Patent and Trademark Office*